(12) United States Patent
Zhu et al.

(10) Patent No.: US 11,834,729 B2
(45) Date of Patent: Dec. 5, 2023

(54) METHOD FOR EXTRACTING RARE EARTH ELEMENTS FROM RARE EARTH ELEMENT HYPERACCUMULATOR

(71) Applicant: Guangzhou Institute of Geochemistry, Chinese Academy of Sciences, Guangzhou (CN)

(72) Inventors: Jianxi Zhu, Guangzhou (CN); Hongping He, Guangzhou (CN); Gaofeng Wang, Guangzhou (CN); Yuanyuan Wang, Guangzhou (CN); Mingqi Sun, Guangzhou (CN); Liuqing He, Guangzhou (CN); Xiaoliang Liang, Guangzhou (CN); Jingming Wei, Guangzhou (CN); Qingze Chen, Guangzhou (CN); Runliang Zhu, Guangzhou (CN)

(73) Assignee: Guangzhou Institute of Geochemistry, Chinese Academy of Sciences, Guangzhou (CN)

( * ) Notice: Subject to any disclaimer, the term of this patent is extended or adjusted under 35 U.S.C. 154(b) by 0 days.

(21) Appl. No.: 18/060,378

(22) Filed: Nov. 30, 2022

(65) Prior Publication Data
US 2023/0151456 A1    May 18, 2023

(30) Foreign Application Priority Data
Dec. 1, 2021 (CN) .......................... 202111454006.2

(51) Int. Cl.
*C22B 59/00* (2006.01)
*C22B 3/06* (2006.01)
(Continued)

(52) U.S. Cl.
CPC .............. *C22B 59/00* (2013.01); *C22B 3/065* (2013.01); *C22B 3/10* (2013.01); *C22B 3/14* (2013.01);
(Continued)

(58) Field of Classification Search
CPC .. C22B 59/00; C22B 3/00; C22B 3/04; C22B 3/06; C22B 3/065; C22B 3/10;
(Continued)

(56) References Cited

FOREIGN PATENT DOCUMENTS

| CN | 111020239 A | * | 4/2020 |
|----|-------------|---|--------|
| CN | 111020239 A |   | 4/2020 |
| CN | 112553483 A |   | 3/2021 |

OTHER PUBLICATIONS

Chong Liu, Wen-Shen Liu, Antony van der Ent, Jean Louis Morel, Hong-Xiang Zheng, Guo-Bao Wang, Ye-Tao Tang, Rong-Liang Qiu. Simultaneous hyperaccumulation of rare earth elements, manganese and aluminum in Phytolacca americana in response to soil properties, Jun. 12, 2021, Chemosphere, vol. 282, (Year: 2021).*

(Continued)

*Primary Examiner* — Vanessa T. Luk
*Assistant Examiner* — Nikolas Takuya Pullen

(57) ABSTRACT

A method for extracting rare earth elements (REEs) from a REE hyperaccumulator, including: subjecting the REE hyperaccumulator to microwave-assisted digestion to obtain a REE extract; subjecting the REE extract to absorption with a chelating resin and elution to obtain a purified REE solution; and subjecting the purified REE solution to precipitation and calcination to obtain high-purity rare earth compound.

5 Claims, 2 Drawing Sheets

(51) Int. Cl.
  *C22B 3/10* (2006.01)
  *C22B 3/14* (2006.01)
  *C22B 3/24* (2006.01)
  *C22B 3/46* (2006.01)
  *C22B 3/26* (2006.01)

(52) U.S. Cl.
  CPC .............. *C22B 3/24* (2013.01); *C22B 3/41* (2021.05); *C22B 3/46* (2013.01)

(58) Field of Classification Search
  CPC .... C22B 3/14; C22B 3/20; C22B 3/42; C22B 3/44; C22B 3/46
  See application file for complete search history.

(56) References Cited

OTHER PUBLICATIONS

Zeinab Chour, Baptiste Laubie, Jean Louis Morel, Yetao Tang, Rongliang Qiu, Marie-Odile Simonnot, Laurence Muhr, Recovery of rare earth elements from Dicranopteris dichotoma by an enhanced ion exchange leaching process, Jun. 26, 2018, Chemical Engineering and Processing—Process Intensification (Year: 2018).*

Lei Wang et al., Determining Rare Earth Elements Contents in Rare Earth Materials by Microwave Digestion / ICP-AES Method, Advances in Fine Petrochemicals, vol. 16, Issue 5, pp. 51-53, Sep. 2015.

Weixin Dong et al., Research on Adsorption Properties and Application of Chelating Resin for Metal Lons, Journal of Shaanxi University of Science and Technology: Natural Science Edition, vol. 28, No. 2, pp. 96-99,103, Apr. 2010.

* cited by examiner

METHOD FOR EXTRACTING RARE EARTH ELEMENTS FROM RARE EARTH ELEMENT HYPERACCUMULATOR

CROSS-REFERENCE TO RELATED APPLICATIONS

This application claims the benefit of priority from Chinese Patent Application No. 202111454006.2, filed on Dec. 1, 2021. The content of the aforementioned application, including any intervening amendments thereto, is incorporated herein by reference in its entirety.

TECHNICAL FIELD

This application relates to extraction of rare earth elements (REEs), and more particularly to a method for extracting REEs from a rare earth element hyperaccumulator.

BACKGROUND

Rare earth element hyperaccumulators have strong tolerance to rare earth elements (REEs), and can accumulate the REEs in large quantities. The above-ground part of the hyperaccumulator has an REE absorption coefficient of no less than 1 (the REE level reaches or exceeds 1000 ppm). Currently, *Carya tomentosa* (Poir.) Nutt., *Carya cathayensis* Sarg., *Blechnum orientate*, and *Dicranopteris dichotoma* (the REE level in the above-ground part reaches 1000-3500 ppm) have been identified as the REE hyperaccumulator, and moreover, many kinds of *Pteridophyta* plants, such as *Glochidion triandrum, Phytolacca Americana, Athyrium yokoscense*, and *Dryopteris erythrosora*, are considered as potential REE hyperaccumulators.

The rapid economic and social development brings increasing demand for rare earth elements and related products. In addition to the REE deposits, REEs can also be extracted from the REE hyperaccumulators. In addition to being used as the REE source, the REE hyperaccumulators can also be widely employed in geological prospecting, phytoremediation of rare earth tailings, and phytomining. In conclusion, these hyperaccumulators can not only play a role as a rare earth resource, but also can promote the alleviation of environmental pollution and improvement of the ecological environment, exhibiting great social, environmental and economic benefits.

However, the existing REE extraction technologies struggle with poor extraction efficiency, which limits the application of REE hyperaccumulators in the remediation of tailings and phytomining. Moreover, it has been rarely reported about the extraction of REEs from the REE hyperaccumulators. The heavy metal hyperaccumulators are commonly treated by centralized landfill, incineration and composting, but these methods still struggle with seepage, low utilization rate of enriched metals, and heavy metal pollution. In view of this, enabling the effective treatment and resource utilization is of great significance for broadening the application of the REE hyperaccumulators. Therefore, it is urgently needed to develop an effective treatment and extraction strategy of the REE hyperaccumulators.

SUMMARY

An objective of this application is to provide a method for extracting rare earth elements (REEs) from a REE hyperaccumulator, in which the microwave-assisted digestion is employed to promote the release of REEs from the REE hyperaccumulator; rare earth elements are absorbed and separated via a chelating resin; and the high-purity rare earth oxides are obtained by precipitation and calcination. The method of the disclosure enables the effective extraction of the rare earths.

Technical solutions of this application are described as follows.

This application provides a method for extracting REEs from a REE hyperaccumulator, comprising:

(1) washing the REE hyperaccumulator followed by drying and crushing to obtain a plant tissue pulp; and adding a digestion solution to the plant tissue pulp followed by microwave-assisted digestion to obtain a REE extract;

(2) adjusting the REE extract to pH 4.5-5.5 with a 3-5 wt. % ammonium bicarbonate solution to precipitate $Fe^{3+}$ and $Al^{3+}$ followed by filtration to remove non-rare earth metal elements, so as to obtain a primary purified rare earth solution;

(3) pouring the primary purified rare earth solution into a chelating resin for adsorption, and repeating the adsorption until a clarity of the primary purified rare earth solution remains unchanged; and eluting the chelating resin with nitric acid to collect an eluate as a secondary purified rare earth solution; and (4) feeding a 10-30 wt. % oxalic acid solution to the secondary purified rare earth solution under stirring at a rate of 10-20 mL/min to form a rare earth oxalate precipitate, followed by standing for 5-10 h and filtering to collect the rare earth oxalate precipitate; washing the rare earth oxalate precipitate with water to pH 5-7, followed by centrifugal dehydration, drying and calcination at 650-900° C. for 50-90 min to obtain a rare earth oxide.

In an embodiment, in step (1), the REE hyperaccumulator is selected from the group consisting of *Blechnum orientate, Odontosoria chusana, Dicranopteris dichotoma, Asplenium trichomanes, Adiantum flabellulatum, Dryopteris erythrosora, Cibotium barometz* and a combination thereof.

In an embodiment, in step (1), the digestion solution is a mixture of an acid solution and a hydrogen peroxide ($H_2O_2$) solution; wherein the acid solution is $HNO_3$ solution, HCl solution or acetic acid solution;

a concentration of the $HNO^3$, HCl or acetic acid solution is 30-35 wt. %; and a concentration of the $H_2O_2$ solution is 25-30 wt. %;

a volume ratio of the acid solution to the $H_2O_2$ solution is (1-1.2):1; and the digestion solution is 10-15% by weight of the plant tissue pulp.

In an embodiment, the microwave-assisted digestion is performed at a microwave power of 1000-1500 W through the following temperature program: rising to 85-100° C.; 85-100° C. for 5-8 min; rising to 120-135° C.; 120-135° C. for 8-10 min; rising to 190-200° C. at a rate of 20-30° C./min; and 190-200° C. for 8-10 min.

In an embodiment, in step (3), the chelating resin is prepared through the following steps:

(a) mixing triethyl phosphate and 1,3-diisopropenylbenzene followed by heating to 130-140° C. and uniform stirring; introducing 2,5-dimethylhexane to initiate a polymerization reaction to obtain a polymer microsphere; and (b) adding the polymer microsphere, a macroporous iminodiacetic acid chelating resin and diethylenetriamine to N-methyl-2-pyrrolidone followed by heating to 115-130° C. and uniform mixing to obtain a reaction mixture; and heating the reaction mixture to 150-160° C. followed by addition of carboxymethyl cellulose and diethyl iminodiacetate, cooling and grinding to obtain a spherical particle as the chelating resin.

In an embodiment, in step (a), a molar ratio of triethyl phosphate to 1,3-diisopropenylbenzene is 1:(1-3);

the 2,5-dimethylhexane is 50-60% of a total weight of the triethyl phosphate and 1,3-diisopropenylbenzene; and in step (b), a weight ratio of the polymer microsphere to the macroporous iminodiacetic acid chelating resin to diethylenetriamine is (2-3):(1-2):(5-7); and a ratio of a total weight of the polymer microsphere, macroporous iminodiacetic acid chelating resin and diethylenetriamine to a volume of N-methyl-2-pyrrolidone is (2-3) (g):1 (mL).

In an embodiment, in step (b), the carboxymethyl cellulose is 8-12% by weight of the reaction mixture; and the diethyl iminodiacetate is 20-30% by weight of the reaction mixture.

Compared to the prior art, this application has the following beneficial effects.

Regarding the REE extraction method provided herein, the REE-rich hyperaccumulator is subjected to the microwave-assisted digestion and absorption on a chelating resin to extract the rare earth elements therein. Specifically, the microwave-assisted digestion can promote the dissolution of plants to obtain a REE extract. Through the adsorption with the chelating resin prepared herein and elution, other non-rare earth metal elements are removed, so as to obtain a high-purity rare earth solution, which is further subjected to precipitation and calcination to obtain the high-purity rare earth oxide, enabling the extraction of REEs. Regarding the preparation of the chelating resin, an absorption polymer resin is subjected to amination reaction with the iminodiacetic acid chelating resin and diethylenetriamine, and then chelating functional groups, such as iminodiacetic acid (IDA) group and ethylene diamine tetraacetic acid (EDTA) group, are introduced by grafting to enable the chelation of REEs. After eluted with nitric acid, rare earth compounds are obtained. The analysis results demonstrate that the REEs mainly include lanthanum, cerium, praseodymium, rubidium, samarium, gadolinium, terbium, and yttrium. In summary, the method provided herein can not only conveniently and effectively extract the rare earth elements from the REE hyperaccumulator, but also prevent the secondary pollution and reduce the production cost.

DETAILED DESCRIPTION OF EMBODIMENTS

Figure 1:
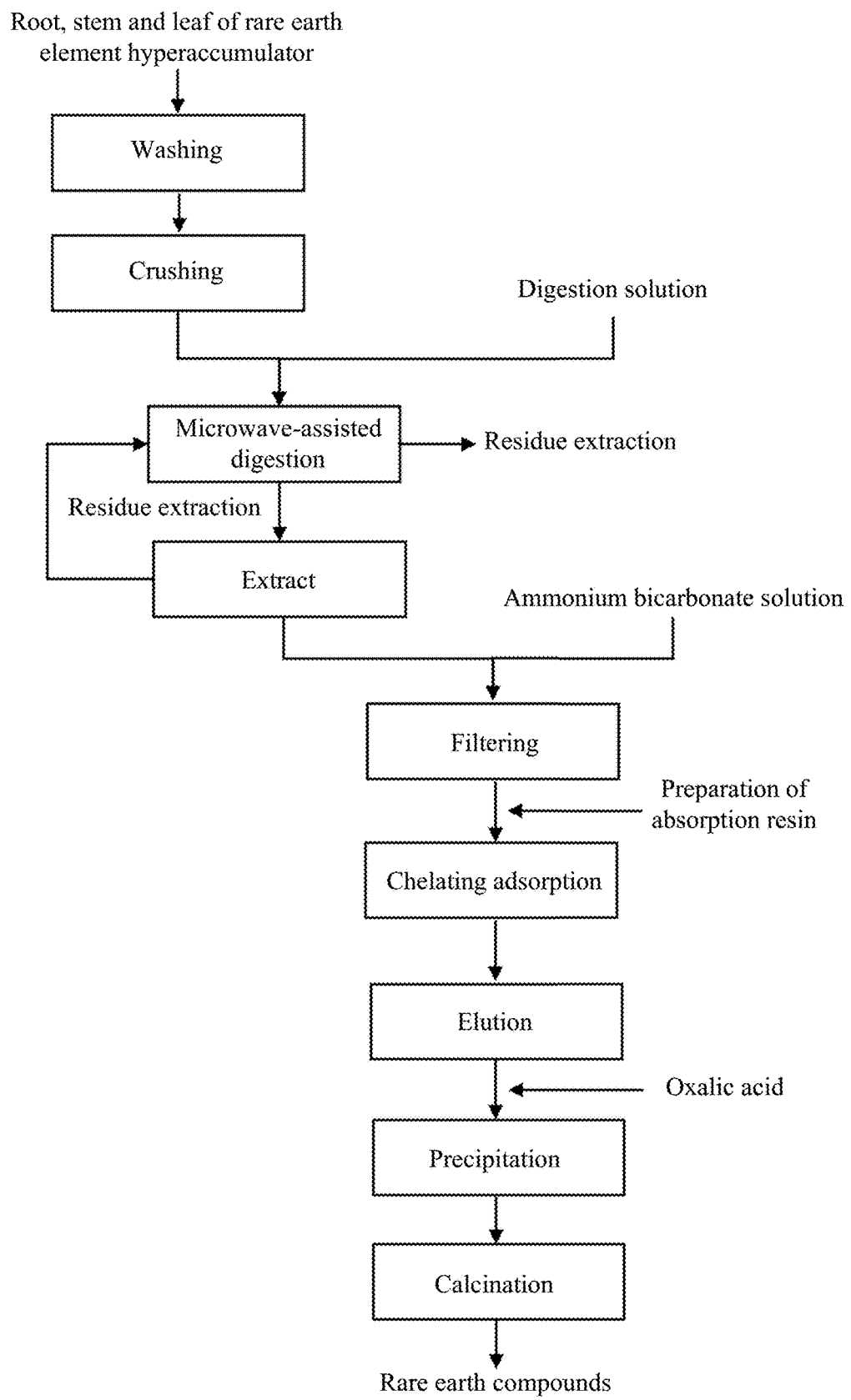
FIG. 1 is a flowchart of a method for extracting rare earth elements (REEs) from a REE hyperaccumulator according to an embodiment of this application.

The disclosure will be described in detail below with reference to embodiments and the accompanying drawings. It should be understood that the embodiments are merely illustrative of this disclosure, and not intended to limit this disclosure. Various modifications made by those skilled in the art without departing from the spirit of the application should still fall within the scope of the present application defined by the appended claims.

Unless otherwise specified, the raw materials and reagents used herein are all commercially available.

As used herein, the digestion solution is selected from the group consisting of $HNO_3/H_2O_2$ solution, $HCl/H_2O_2$ solution and acetic acid/$H_2O_2$ solution, where a concentration of the $HNO_3$, HCl or acetic acid solution is 30-35 wt. %; a concentration of the $H_2O_2$ solution is 25-30 wt. %; and a volume ratio of the acid solution to the $H_2O_2$ solution is (1-1.2):1.

Example 1

Provided herein was a method for extracting rare earth elements (REEs) from a REE hyperaccumulator, which was performed through the following steps.

(1) Microwave-Assisted Digestion

The REE hyperaccumulator was washed, dried and crushed to obtain a plant tissue pulp. The plant tissue pulp was added with a digestion solution (a mixture of 30 wt. % $HNO_3$ and 25 wt. % $H_2O_2$ in a volume ratio of 1:1), and then subjected to microwave-assisted digestion to obtain a REE extract, where the digestion solution was 12% by weight of the plant tissue pulp; and the microwave-assisted digestion was performed at a microwave power of 1200 W through the following temperature program: rising to 90° C.; 90° C. for 6 min; rising to 130° C.; 130° C. for 8 min; rising to 200° C. at a rate of 25° C./min; and 200° C. for 10 min.

(2) Precipitation and Purification

The REE extract was collected, adjusted to pH 5 with a 4 wt. % ammonium bicarbonate solution to precipitate metal ions such as $Fe^{3+}$ and $Al^{3+}$, and filtered to remove the non-rare earth elements to obtain a primary purified rare earth solution.

(3) Adsorption and Elution

The primary purified rare earth solution was poured into a chelating resin for adsorption, and the adsorption process was repeated until a clarity of the primary purified rare earth solution remained unchanged. The chelating resin was eluted with nitric acid to collect an eluate as a secondary purified rare earth solution.

The chelating resin was prepared as follows.

(a) Triethyl phosphate and 1,3-diisopropenylbenzene were mixed in a molar ratio of 1:2, heated to 135° C. and uniformly stirred to obtain a reaction mixture. Then 2,5-dimethylhexane was added to the reaction mixture to initiate a polymerization reaction to obtain a polymer microsphere, where the 2,5-dimethylhexane was 55% by weight of the reaction mixture.

(b) The polymer microsphere, a macroporous iminodiacetic acid chelating resin and diethylenetriamine were dissolved in N-methyl-2-pyrrolidone, heated to 120° C. and uniformly mixed to obtain an iminodiacetic acid chelating resin, where a weight ratio of the polymer microsphere to the macroporous iminodiacetic acid chelating resin to diethylenetriamine was 2:1:6; and a ratio of a total weight of the polymer microsphere, the macroporous iminodiacetic acid chelating resin and diethylenetriamine to a volume of N-methyl-2-pyrrolidone was 2 (g):1 (mL). Then the iminodiacetic acid chelating resin was heated to 155° C., added with carboxymethyl cellulose and diethyl iminodiacetate, cooled and ground to obtain the chelating resin, where the carboxymethyl cellulose was 10% by weight of the iminodiacetic acid chelating resin, and diethyl iminodiacetate was 25% by weight of the iminodiacetic acid chelating resin.

(4) Precipitation and Calcination

The secondary purified rare earth solution was dropwise added with a 20 wt. % oxalic acid solution under stirring at a rate of 10-15 mL/min until no precipitate was generated, and subjected to standing for 8 h and filtration to collect an oxalate precipitate, which was washed with water to pH 5.5-6, and subjected to centrifugal dehydration, drying and calcination at 750° C. for 80 min to obtain the rare earth oxide.

The REE extraction process was schematically shown in FIG. 1.

Figure 2:
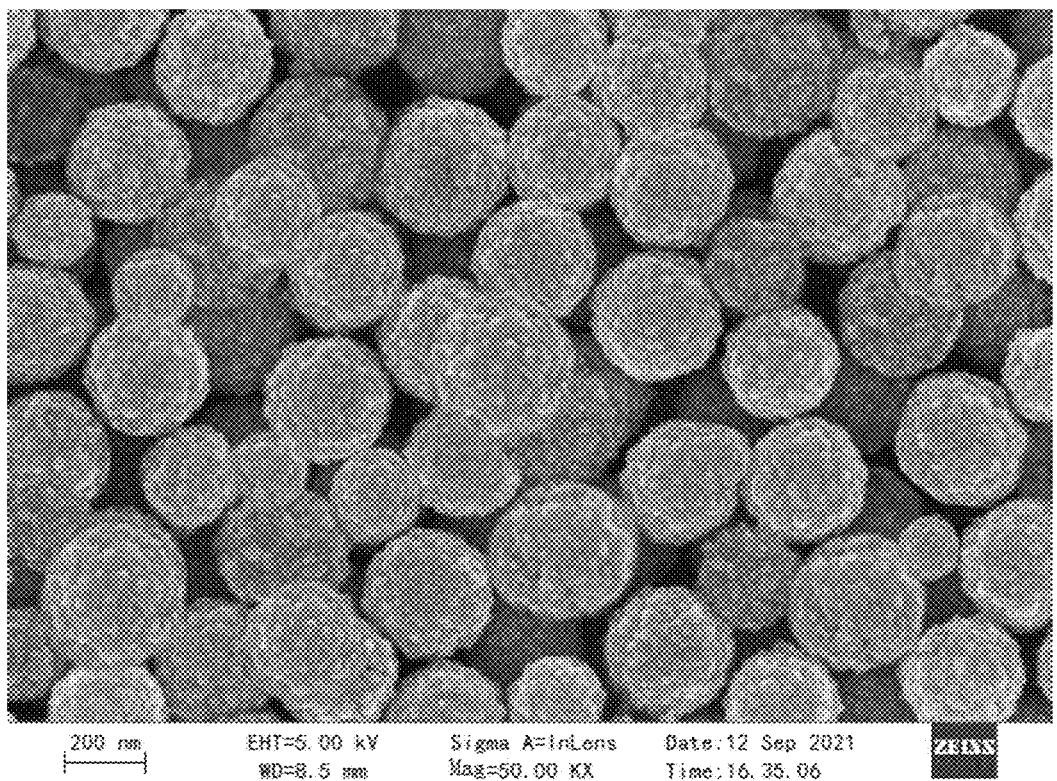
FIG. 2 is a scanning electron microscope image of a chelating resin prepared according to an embodiment of this application.

Referring to the SEM image in FIG. 2, it can be seen that the chelating resin prepared herein had nano-microsphere structure and uneven surface, and contains tiny pores, which was conducive to enlarging the adsorption surface area.

Example 2

Provided herein was a method for extracting rare earth elements (REEs) from a REE hyperaccumulator, which was performed through the following steps.

(1) Microwave-Assisted Digestion

The REE hyperaccumulator was washed, dried and crushed to obtain a plant tissue pulp. The plant tissue pulp was added with a digestion solution (a mixture of 35 wt. % HCl and 25 wt. % $H_2O_2$ in a volume ratio of 1.1:1), and then subjected to microwave-assisted digestion to obtain a REE extract, where the digestion solution was 15% by weight of the plant tissue pulp. The microwave-assisted digestion was performed at a microwave power of 1500 W through the following temperature program: rising to 100° C.; 100° C. for 8 min, rising to 135° C.; 135° C. for 8 min; rising to 200° C. at a rate of 30° C./min, and 200° C. for 8 min.

(2) Precipitation and Purification

The REE extract was collected, adjusted to pH 5.5 with a 5 wt. % ammonium bicarbonate solution to precipitate and remove impurities, and then filtered to obtain a primary purified rare earth solution.

(3) Adsorption and Elution

The primary purified rare earth solution was poured into a chelating resin for adsorption, and the adsorption process was repeated until a clarity of the primary purified rare earth solution remains unchanged. The chelating resin was eluted with nitric acid to collect an eluate as a secondary purified rare earth solution.

The chelating resin was prepared as follows.

(a) Triethyl phosphate and 1,3-diisopropenylbenzene were mixed in a molar ratio of 1:3, heated up to 140° C. and uniformly stirred to obtain a reaction mixture. Then 2,5-dimethylhexane was added to the reaction mixture to initiate a polymerization reaction to obtain a polymer microsphere, where the 2,5-dimethylhexane was 60% by weight of the reaction mixture.

(b) The polymer microsphere, a macroporous iminodiacetic acid chelating resin and diethylenetriamine were dissolved in N-methyl-2-pyrrolidone, followed by heating to 130° C. and uniform mixing to obtain iminodiacetic acid chelating resin. A weight ratio of the polymer microsphere to the macroporous iminodiacetic acid chelating resin to diethylenetriamine was 3:2:7; and a ratio of a total weight of the polymer microsphere, the macroporous iminodiacetic acid chelating resin and diethylenetriamine to a volume of N-methyl-2-pyrrolidone was 3 (g):1 (mL). Then the iminodiacetic acid chelating resin was heated to 160° C., and added with carboxymethyl cellulose and diethyl iminodiacetate, and cooled and ground to obtain a chelating absorption resin, where the carboxymethyl cellulose was 12% by weight of the iminodiacetic acid chelating resin, and diethyl iminodiacetate was 30% by weight of the iminodiacetic acid chelating resin.

(4) Precipitation and Calcination

The secondary purified rare earth solution was dropwise added with a 10 wt. % oxalic acid solution under stirring at a rate of 15-20 mL/min until no precipitate was generated, and subjected to standing for 10 h, and filtration to collect an oxalate precipitate, which was washed with water to pH 6-7, and subjected to centrifugal dehydration, drying and calcination at 900° C. for 50 min to obtain the rare earth oxide.

Example 3

Provided herein was a method for extracting rare earth elements (REEs) from a REE hyperaccumulator, which was performed through the following steps.

(1) Microwave-Assisted Digestion

The REE hyperaccumulator was washed, dried and crushed to obtain a plant tissue pulp. The plant tissue pulp was added with a digestion solution (a mixture of 30 wt. % acetic acid and 28 wt. % $H_2O_2$ in a volume ratio of 1.2:1), and then subjected to microwave-assisted digestion to obtain a REE extract, where the digestion solution was 10% by weight of the plant tissue pulp; and the microwave-assisted digestion was performed at a microwave power of 1000 W through the following temperature program: rising to 85° C.; 85° C. for 8 min, rising to 120° C.; 120° C. for 10 min; rising to 190° C. at a rate of 20° C./min; and 190° C. for 10 min.

(2) Precipitation and Purification

The REE extract was collected, adjusted to pH 4.5 with a 3 wt. % ammonium bicarbonate solution to precipitate to remove impurities, and filtered to obtain a primary purified rare earth solution.

(3) Adsorption and Elution

The primary purified rare earth solution was poured into a chelating resin for adsorption, and the adsorption process was repeated until a clarity of the primary purified rare earth solution remains unchanged. The chelating resin was eluted with nitric acid to collect an eluate as a secondary purified rare earth solution.

The chelating resin was prepared by the following steps.

(a) Triethyl phosphate and 1,3-diisopropenylbenzene were mixed in a molar ratio of 1:1. heated to 130° C. and uniformly stirred to obtain a reaction mixture. Then 2,5-dimethylhexane was added to the reaction mixture to initiate a polymerization reaction to obtain a polymer microsphere, where the 2,5-dimethylhexane was 50% by weight of the reaction mixture.

(b) The polymer microsphere, a macroporous iminodiacetic acid chelating resin and diethylenetriamine were dissolved in N-methyl-2-pyrrolidone, heated to 115° C. and uniformly mixed to obtain an iminodiacetic acid chelating resin, where a weight ratio of the polymer microsphere to the macroporous iminodiacetic acid chelating resin to diethylenetriamine was 2:1:5; and a ratio of a total weight of the polymer microsphere, the macroporous iminodiacetic acid chelating resin and diethylenetriamine to a volume of N-methyl-2-pyrrolidone was 2 (g):1 (mL). Then the iminodiacetic acid chelating resin was heated to 150° C., and added with carboxymethyl cellulose and diethyl iminodiacetate, cooled and ground to obtain the chelating resin, where the carboxymethyl cellulose was 8% by weight of the iminodiacetic acid chelating resin, and diethyl iminodiacetate was 20% by weight of the iminodiacetic acid chelating resin.

(4) Precipitation and Calcination

The secondary purified rare earth solution was dropwise added with a 30 wt. % oxalic acid solution under stirring at a rate of 10-15 mL/min until no precipitate was generated, and subjected to standing for 5 h and filtration to collect an oxalate precipitate, which was washed with water to pH 5-6, and subjected to centrifugal dehydration, drying and calcination at 650° C. for 90 min to obtain the rare earth oxide.

Example 4

Provided herein was a method for extracting rare earth elements (REEs) from a REE hyperaccumulator, which was performed through the following steps.

(1) Microwave-Assisted Digestion

The REE hyperaccumulator was washed, dried and crushed to obtain a plant tissue pulp. The plant tissue pulp was added with a digestion solution (a mixture of 32 wt. % acetic acid and 30 wt. % $H_2O_2$ in a volume ratio of 1.2:1), and subjected to microwave-assisted digestion to obtain a REE extract, where the digestion solution was 14% by weight of the plant tissue pulp; and the microwave-assisted digestion was performed at a microwave power of 1350 W through the following temperature program: rising 95° C.; 95° C. for 7 min; rising to 128° C.; 128° C. for 9 min; rising to 195° C. at a rate of 27° C./min; and 195° C. for 9 min.

(2) Precipitation and Purification

The REE extract was collected, adjusted to pH 5 with a 5 wt. % ammonium bicarbonate solution, to precipitate metal ions such as $Fe^{3+}$ and $Al^{3+}$, and filtered to remove the non-rare earth elements to obtain a primary purified rare earth solution.

(3) Adsorption and Elution

The primary purified rare earth solution was poured into a chelating resin for adsorption, and the adsorption process was repeated until a clarity of the primary purified rare earth solution remains unchanged. The chelating resin was eluted with nitric acid to collect an eluate as a secondary purified rare earth solution.

The chelating resin was prepared as follows.

(a) Triethyl phosphate and 1,3-diisopropenylbenzene were mixed in a molar ratio of 1:2, heated up to 134° C. and uniformly stirred. Then 2,5-dimethylhexane was added to the reaction mixture to initiate a polymerization reaction to obtain a polymer microsphere, where the 2,5-dimethylhexane was 56% by weight of the reaction mixture.

(b) The polymer microsphere, a macroporous iminodiacetic acid chelating resin and diethylenetriamine were dissolved in N-methyl-2-pyrrolidone, heated to 125° C. and uniform mixed to obtain an iminodiacetic acid chelating resin, where a weight ratio of the polymer microsphere to the macroporous iminodiacetic acid chelating resin to diethylenetriamine was 3:1:5; and a ratio of a total weight of the polymer microsphere, the macroporous iminodiacetic acid chelating resin and diethylenetriamine to a volume of N-methyl-2-pyrrolidone was 2 (g):1 (mL). Then the iminodiacetic acid chelating resin was heated to 156° C., added with carboxymethyl cellulose and diethyl iminodiacetate, cooled and ground to obtain the chelating resin, where the carboxymethyl cellulose was 9% by weight of the iminodiacetic acid chelating resin, and diethyl iminodiacetate was 27% by weight of the iminodiacetic acid chelating resin.

(4) Precipitation and Calcination

The secondary purified rare earth solution was dropwise added with a 25 wt. % oxalic acid solution under stirring at a rate of 15-20 mL/min until no precipitate was generated, and subjected to standing for 7 h and filtration to collect an oxalate precipitate, which was washed with water to pH 5.5-6.5, and subjected to centrifugal dehydration, drying and calcination at 800° C. for 70 min to obtain the rare earth oxide.

Comparative Example 1

Provided herein was a method for extracting rare earth elements (REEs) from a REE hyperaccumulator, which was performed through the following steps.

Step (1) The REE hyperaccumulator was washed, dried and crushed to obtain a plant tissue pulp. The plant tissue pulp was added with a digestion solution (a mixture of 35% HCl to 25% $H_2O_2$ in a volume ratio of 1.1:1), and then subjected to microwave-assisted digestion to obtain a REE extract, where the digestion solution was 15% by weight of the plant tissue pulp; and the microwave-assisted digestion was performed at a microwave power of 1500 W through heating to 135° C. and maintaining at 135° C. for 24 min.

Steps (2) to (3) were the same as those in Example 1.

Comparative Example 2

Provided herein was a method for extracting rare earth elements (REEs) from a REE hyperaccumulator, which was performed through the following steps.

Steps (1) to (2) were the same as those in Example 1.

In step (3), the chelating resin adopted macroporous iminodiacetic acid chelating resin.

In this disclosure, the REE hyperaccumulator was selected from the group consisting of *Blechnum orientate, Odontosoria chusana, Dicranopteris dichotoma, Asplenium trichomanes, Adiantum flabellulatum, Dryopteris erythrosora, Cibotium barometz, Carya tomentosa* (Poir.) Nutt., *Carya cathayensis* Sarg. and a combination thereof. Example 1 used *Blechnum orientate, Odontosoria chusana,* and *Cibotium barometz* as group (A). Example 2 used *Asplenium trichomanes* and *Dryopteris erythrosora* as group (B). Example 3 used *Dicranopteris dichotoma* and *Adiantum flabellulatum* as group (C). Example 4 used *Carya tomentosa* (Poir.) Nutt., *Carya cathayensis* Sarg. and *Adiantum flabellulatum* as group (D). The plants in each group were subjected to microwave-assisted digestion. After that, samples were taken from each group, and tested for rare earth metals and the contents of the rare earth metals, and the results were shown in Table 1.

TABLE 1

| Rare earth metal content in REE hyperaccumulators (μg/g) | | | | |
|---|---|---|---|---|
| | Group (A) | Group (B) | Group (C) | Group (D) |
| La | 845.00 | 765.40 | 787.80 | 1175.20 |
| Ce | 116.68 | 142.40 | 182.41 | 133.57 |
| Pr | 194.35 | 196.69 | 253.91 | 362.73 |
| Nd | 679.25 | 658.60 | 948.39 | 1245.26 |

TABLE 1-continued

Rare earth metal content in REE hyperaccumulators (μg/g)

| | Group (A) | Group (B) | Group (C) | Group (D) |
|---|---|---|---|---|
| Sm | 118.95 | 108.22 | 182.10 | 208.37 |
| Gd | 89.70 | 68.17 | 142.11 | 118.88 |
| Tb | 12.74 | 9.72 | 21.12 | 16.14 |
| Y | 429.00 | 178.00 | 575.70 | 271.20 |
| Total amount | 2485.67 | 2127.21 | 3093.54 | 3531.34 |

The solutions obtained by the extraction methods described in the examples and comparative examples were tested for rare earth metals and the contents of the rare earth metals, and the results were shown in Table 2.

TABLE 2

Rare earth metal content in high-purity rare earth solutions (μg/g)

| | Example 1 | Example 2 | Example 3 | Example 4 | Comparative Example 1 | Comparative Example 2 |
|---|---|---|---|---|---|---|
| La | 625.93 | 575.49 | 606.00 | 940.16 | 402.38 | 345.65 |
| Ce | 96.43 | 118.67 | 144.77 | 102.74 | 46.67 | 38.16 |
| Pr | 143.96 | 122.93 | 211.60 | 276.89 | 74.75 | 100.76 |
| Nd | 488.67 | 467.09 | 764.83 | 965.32 | 271.70 | 336.56 |
| Sm | 99.13 | 88.71 | 156.99 | 173.64 | 49.56 | 54.83 |
| Gd | 72.93 | 56.34 | 109.31 | 93.60 | 39.00 | 31.28 |
| Tb | 9.80 | 5.40 | 12.42 | 10.09 | 5.79 | 4.14 |
| Y | 275.00 | 121.92 | 359.81 | 174.97 | 204.29 | 73.30 |
| Total amount | 1811.85 | 1556.55 | 2365.73 | 2737.41 | 1094.14 | 984.68 |

As illustrated above, the method for extracting rare earth elements in REE hyperaccumulator provided herein can extract rare earth elements such as La, Ce, Pr, Nd, Sm, Gd, Tb and Y with an extraction rate ranging from 62% to 86%.

By comparing Comparative Example 1 and Comparative Example 2, it can be seen that the microwave-assisted digestion and the chelating resin have contributed to the extraction of rare earth elements.

The high-purity rare earth solution was subjected to oxalic acid precipitation and calcination to obtain rare-earth oxides. After that, the purity of rare-earth was measured, and the results were shown in Table 3.

TABLE 3

Rare earth metal content of rare earth oxides (μg/g)

| | Example 1 | Example 2 | Example 3 | Example 4 |
|---|---|---|---|---|
| La | 33.48% | 36.83% | 25.59% | 34.14% |
| Ce | 5.36% | 7.66% | 6.17% | 3.73% |
| Pr | 7.86% | 7.80% | 8.93% | 8.14% |
| Nd | 26.92% | 28.55% | 32.29% | 35.66% |
| Sm | 5.46% | 5.78% | 6.69% | 6.25% |
| Gd | 3.95% | 3.64% | 4.62% | 3.37% |
| Tb | 0.54% | 0.35% | 0.73% | 0.86% |
| Y | 15.42% | 7.80% | 14.19% | 6.35% |
| Purity | 99.00% | 98.40% | 99.20% | 98.50% |

The process of oxalic acid precipitation and calcination will not cause the generation of harmful gas and other impurities, so that the rare earth level in the obtained rare earth oxide is increased. It was also demonstrated that through the combination of the microwave-assisted digestion, chelating resin absorption, precipitation and calcination, the effective extraction of REEs from the REE hyperaccumulator was enabled, where the final extraction rate can reach more than 85%, and the purity of rare earth oxides was up to 99.2%.

What is claimed is:

1. A method for extracting rare earth elements (REEs) from a REE hyperaccumulator, comprising:
    (1) washing the REE hyperaccumulator followed by drying and crushing to obtain a plant tissue pulp; and adding a digestion solution to the plant tissue pulp followed by microwave-assisted digestion to obtain a REE extract;
    (2) adjusting pH of the REE extract with an ammonium bicarbonate solution, followed by precipitation and filtration to remove impurities, so as to obtain a primary purified rare earth solution;
    (3) pouring the primary purified rare earth solution into a chelating resin for adsorption, and repeating the adsorption; and eluting the chelating resin with nitric acid to collect an eluate as a secondary purified rare earth solution; and
    (4) subjecting the secondary purified rare earth solution to precipitation and calcination to obtain a rare earth oxide;
    wherein the digestion solution is a mixture of an acid solution and a hydrogen peroxide ($H_2O_2$) solution; wherein the acid solution is $HNO_3$ solution, HCl solution or acetic acid solution;
    the microwave-assisted digestion is performed at a microwave power of 1000-1500 W through the following temperature program: rising to 85-100° C.; 85-100° C. for 5-8 min; rising to 120-135° C.; 120-135° C. for 8-10 min; rising to 190-200° C. at a rate of 20-30° C./min; and 190-200° C. for 8-10 min;
    the chelating resin is prepared through the following steps:
    (a) mixing triethyl phosphate and 1,3-diisopropenylbenzene followed by heating to 130-140° C. and stirring; introducing 2,5-dimethylhexane to initiate a polymerization reaction to obtain a polymer microsphere; and
    (b) adding the polymer microsphere, a macroporous iminodiacetic acid chelating resin and diethylenetriamine to N-methyl-2-pyrrolidone followed by heating to 115-130° C. and mixing to obtain a reaction mixture; and heating the reaction mixture to 150-160° C. followed by addition of carboxymethyl cellulose and diethyl iminodiacetate, cooling and grinding to obtain a spherical particle as the chelating resin;
    wherein in step (a), a molar ratio of triethyl phosphate to 1,3-diisopropenylbenzene is 1: (1-3);
    the 2,5-dimethylhexane is 50-60% of a total weight of the triethyl phosphate and 1,3-diisopropenylbenzene;
    in step (b), a weight ratio of the polymer microsphere to the macroporous iminodiacetic acid chelating resin to diethylenetriamine is (2-3):(1-2):(5-7); and
    the carboxymethyl cellulose is 8-12% by weight of the reaction mixture; and the diethyl iminodiacetate is 20-30% by weight of the reaction mixture.

2. The method of claim 1, wherein in step (1), the REE hyperaccumulator is selected from the group consisting of *Blechnum orientate, Odontosoria chusana, Dicranopteris dichotoma, Asplenium trichomanes, Adiantum flabellulatum, Dryopteris erythrosora, Cibotium barometz* and a combination thereof.

3. The method of claim 1, wherein in step (1), a concentration of the $HNO_3$, HCl or acetic acid solution is 30-35 wt %; and a concentration of the $H_2O_2$ solution is 25-30 wt. %;

a volume ratio of the acid solution to the $H_2O_2$ solution is (1-1.2):1; and the digestion solution is 10-15% by weight of the plant tissue pulp.

4. The method of claim 1, wherein in step (b), a ratio of a total weight of the polymer microsphere, macroporous iminodiacetic acid chelating resin and dithylenetriamine to a volume of N-methyl-2-pyrrolidone is (2~3) (g):1 (mL).

5. The method of claim 1, wherein in step (4), the precipitation and calcination comprise:

feeding a 10-30 wt. % oxalic acid solution to the secondary purified rare earth solution under stirring at a rate of 10-20 mL/min to form a rare earth oxalate precipitate, followed by standing for 5-10 h and filtering to collect the rare earth oxalate precipitate; washing the rare earth oxalate precipitate with water to pH 5-7, followed by centrifugal dehydration, drying and calcination at 650-900° C. for 50-90 min to obtain the rare earth oxide.

\* \* \* \* \*